(12) United States Patent
Tang et al.

(10) Patent No.: US 10,298,338 B2
(45) Date of Patent: May 21, 2019

(54) METHOD FOR EVALUATING QUALITY OF RADIO FREQUENCY SIGNALS FOR STELLITE NAVIGATION SYSTEM

(71) Applicant: Huazhong University of Science and Technology, Wuhan (CN)

(72) Inventors: Zuping Tang, Wuhan (CN); Jiaolong Wei, Wuhan (CN); Xiaoqing Zhang, Wuhan (CN); Changjian Liu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 305 days.

(21) Appl. No.: 15/532,501

(22) PCT Filed: Oct. 16, 2014

(86) PCT No.: PCT/CN2014/088745
§ 371 (c)(1),
(2) Date: Jun. 1, 2017

(87) PCT Pub. No.: WO2015/039631
PCT Pub. Date: Mar. 26, 2015

(65) Prior Publication Data
US 2017/0359132 A1 Dec. 14, 2017

(30) Foreign Application Priority Data
Sep. 17, 2013 (CN) .......................... 2013 1 0428735

(51) Int. Cl.
*H04B 17/309* (2015.01)
*G01C 21/26* (2006.01)
(Continued)

(52) U.S. Cl.
CPC ........... *H04B 17/309* (2015.01); *G01C 21/26* (2013.01); *G01S 19/02* (2013.01); *G01S 19/39* (2013.01);
(Continued)

(58) Field of Classification Search
CPC ....... H04B 17/309; G01C 21/26; G01S 19/02; G01S 19/39; G01S 19/42; G01S 19/30; B60W 2550/402
See application file for complete search history.

(56) References Cited

U.S. PATENT DOCUMENTS 7,949,038 B2* 5/2011 Avellone ................. G01S 19/30
342/352
2003/0199254 A1* 10/2003 Kusbel .................. H03J 1/0008
455/77
(Continued)

*Primary Examiner* — Calvin Cheung
(74) *Attorney, Agent, or Firm* — Matthias Scholl P.C.; Matthias Scholl

(57) ABSTRACT

A method for evaluating the quality of a radio frequency signal for a satellite navigation system, the method comprising: sampling the payload radio frequency signal of a satellite to obtain an intermediate frequency signal, and filtering the signal; downconverting the filtered intermediate signal to obtain the corresponding actual baseband signal; generating the signal components of the ideal baseband signal branches on the basis of the obtained actual baseband signal and the signal system thereof; reproducing the ideal baseband signal, which is used to evaluating the actual baseband signal; establishing a correlation function between the actual baseband signal to be evaluated and the ideal baseband signal, and obtaining through corresponding calculations a series of quality evaluation indexes such as spurious transmission in the band and related loss, thereby enabling the evaluation of the quality of the radio frequency signal. The present invention clarifies the relation between signal quality indexes and the capturing, tracking, and (Continued)

demodulation performance of a signal, and can clearly and regularly evaluate the effect of the signal quality on navigation performance.

13 Claims, 1 Drawing Sheet

(51) Int. Cl.
    *G01S 19/42*     (2010.01)
    *G01S 19/02*     (2010.01)
    *G01S 19/39*     (2010.01)
    *G01S 19/30*     (2010.01)

(52) U.S. Cl.
    CPC ........ *G01S 19/42* (2013.01); *B60W 2550/402* (2013.01); *G01S 19/30* (2013.01)

(56) References Cited

U.S. PATENT DOCUMENTS

| | | | | |
|---|---|---|---|---|
| 2003/0203743 A1* | 10/2003 | Sugar | ............... | H04B 1/005 455/550.1 |
| 2004/0041948 A1* | 3/2004 | Collins | ............... | H04N 5/38 348/555 |
| 2009/0160704 A1* | 6/2009 | Zhao | ............... | G01S 19/36 342/357.29 |
| 2010/0195746 A1* | 8/2010 | Chen | ............... | G01S 19/30 375/259 |
| 2010/0279732 A1* | 11/2010 | Hjelm | ............... | G01S 19/06 455/552.1 |

* cited by examiner

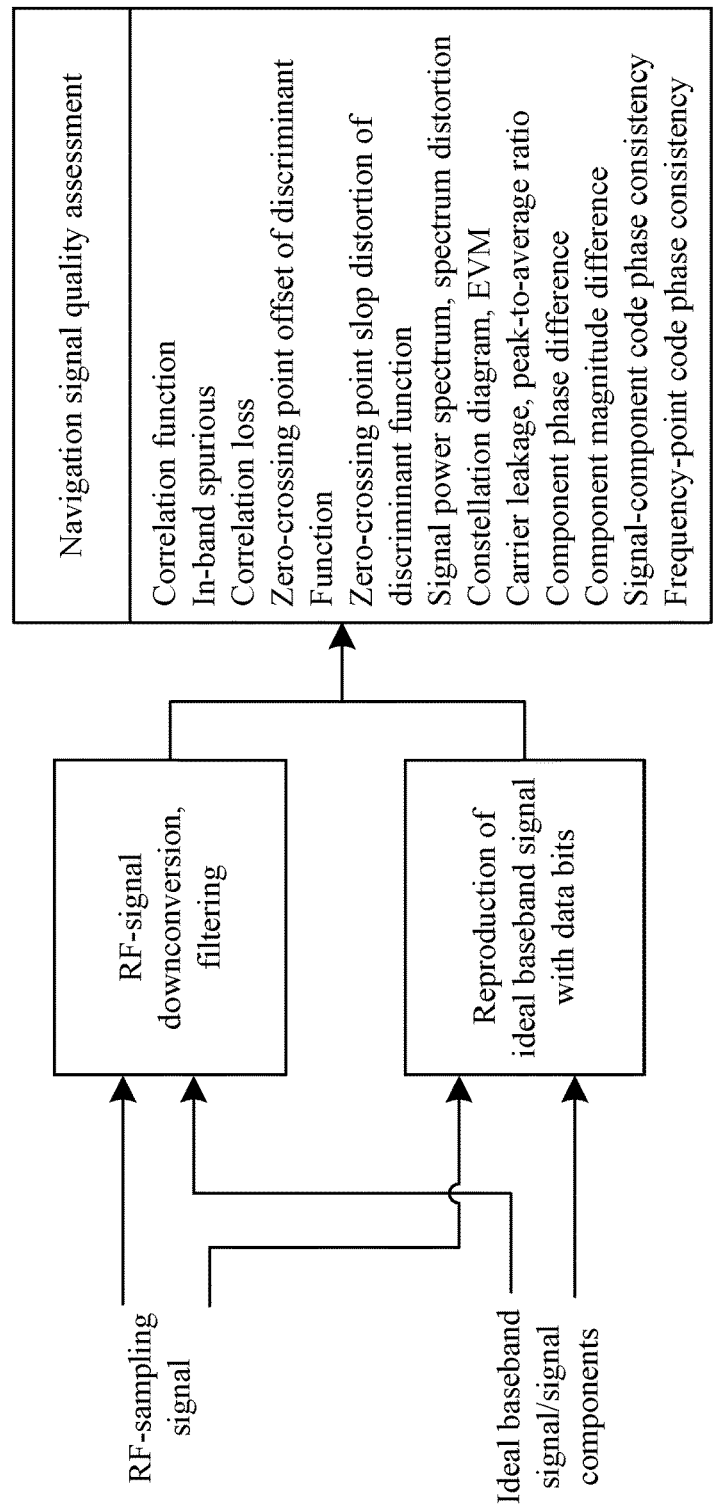

METHOD FOR EVALUATING QUALITY OF RADIO FREQUENCY SIGNALS FOR STELLITE NAVIGATION SYSTEM

CROSS-REFERENCE TO RELATED APPLICATIONS

This application is a National Stage Appl. filed under 35 U.S.C. 371 of International Patent Application No. PCT/CN2014/088745 with an international filing date of Oct. 16, 2014, designating the United States, now pending, and further claims foreign priority benefits to Chinese Patent Application No. 201310428735.X filed Sep. 17, 2013. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The present invention pertains to the field of satellite navigation technology, and more particularly to a method for assessing a quality of a radio frequency (RF) signals for a satellite navigation system.

Description of the Related Art

In a navigation system, satellite navigation signals are used for timing and ranging. This is reflected in three aspects related to navigation performance carrier tracking performance, pseudo-code tracking performance, and message demodulation performance Navigation signal framework determines the inherent performance of a navigation system, while spatial signal quality determines the difference between the best achievable performance of an actual navigation system and the performance of the signal framework. The design of a communication system is aimed at correct demodulation of information, and the performance of a communication system is in relation to error of a sampling decision moment signal vector; whereas the design of a navigation system is aimed at ranging accuracy, which depends on quality of signal waveform. Therefore, a navigation system requires higher signal quality than a general communication system, and accordingly, it puts forward higher requirements in comprehensiveness and accuracy to signal quality assessment methods thereof.

The prior art has proposed a number of quality assessment schemes for satellite navigation systems. For example, CN102571652A discloses a method for assessment of GNSS baseband signal, in which GNSS baseband signal performance is analyzed in aspects of frequency-domain power spectrum, time-domain waveform, code-chip edge, modulation error as well as some related characteristics. However, further studies show that the above schemes still suffer from the following limitations:

1) The method only takes into account assessment of baseband signal quality, thus cannot truly reflect the impact of spatial signal quality to navigation performance, and it does not include a signal processing method for non-distortion frequency conversion from radio frequency signal to baseband; moreover, because the method employs a baseband sampling mode, it requires different analog channels to be configured for signals at different frequency points, which inevitably introduces time-delay inconsistency among these analog channels, resulting in decreased accuracy of the assessment of inter-frequency signal consistency;

2) The six assessment metrics of an eye diagram are somewhat idealized, and difficult to be applied in quality assessment of a composite signal containing three or more branch signal components in current GNSS, while such composite signal is a main form of signals adopted in currently mainstream four major navigation systems, namely, BeiDou, GPS, Galileo and GLONASS;

3) The method for assessment of quadrature phase error and magnitude imbalance has a narrow applicable scope, generally being used for QPSK modulation, and is also difficult to be applied in quality assessment of a composite signal containing three or more branch signal components in current GNSS; and 4) The method does not explicitly explain the relationships between these metrics and signal-acquisition, signal-tracking and signal-demodulation, thus it cannot result in a quantitative assessment of the impact of signal quality to navigation performance

SUMMARY OF THE INVENTION

In view of the above-described problems, it is one objective of the invention to provide a method for assessing a quality of a radio frequency signal for a satellite navigation system. The method uses direct RF-sampling navigation signal and a sets of assessment metrics designed in combination of inherent characteristics of a satellite navigation signal, and accordingly can more explicitly explain the relationships between the signal quality metrics and signal-acquisition, -tracking and -demodulation performance, and in the meantime, achieve clear and quantitative assessment of the impact of signal quality to navigation performance.

To achieve the above objective, in accordance with one embodiment of the invention, there is provided a quality of the RF signal assessment method for a satellite navigation system, characterized in that the method comprises the following steps:

1) sampling a RF signal of satellite payload to obtain an intermediate frequency (IF) signal, then filtering the IF signal;

2) downconverting the filtered IF signal to obtain a corresponding actual baseband signal;

3) on the basis of the actual baseband signal obtained in 2) and a signal framework thereof, generating respective branch signal components of an ideal baseband signal having a same sampling rate and one-code-cycle length; then, by utilizing the actual baseband signal and the respective branch signal components of the ideal baseband signal, reproducing an ideal baseband signal to be used to assess the actual baseband signal;

4) establishing a correlation function between an actual baseband signal to-be-assessed and the ideal baseband signal, the correlation function being shown as below:

$$CCF(\tau) = \frac{\int_0^{T_p} s_{rec}(t) s_0^*(t-\tau) dt}{\sqrt{\int_0^{T_p} |s_{rec}(t)|^2 dt \int_0^{T_p} |s_0(t)|^2 dt}}$$

where, $s_{rec}(t)$ denotes a variable that represents the actual baseband signal $s_{rec}$ and is determined by a time variable t, $s_0(t)$ denotes a variable that represents the ideal baseband signal $s_0$ and is determined by the time variable t, t denotes the time variable, $\tau$ denotes a correlation time delay, Tp denotes a length of time of the actual baseband signal $s_{rec}$, $s_0^*(t-\tau)$ denotes a conjugate operation executed on a variable that represents the ideal baseband signal $s_0$ and is determined by both the time variable t and the correlation time delay $\tau$, CCF($\tau$) denotes a variable that represents a cross-correlation sequence CCF between the actual baseband signal $s_{rec}$ and the ideal baseband signal $s_0$ and is determined by the correlation time delay $\tau$; and 5) by utilizing the correlation function established in 4), calculating quality-assessment metrics related to in-band spurious and correlation loss, thereby accomplishing quality assessment procedure of the RF signal.

In a class of this embodiment, the in-band spurious and the related losses are calculated according to the following formulas:

$$r_{ST}[dBc]=10 \times \log_{10}(1-\max(|CCF(\tau)|^2))$$

where, $r^{ST}[dBC]$ denotes a dB value of in-band spurious, CCF($\tau$) denotes a variable that represents a cross-correlation sequence between an actual baseband signal and an ideal baseband signal and is determined by correlation time delay $\tau$;

$$L_{CCF}[dB]=20 \times \log_{10}(\max(|CCF(\tau)|^2))$$

where, $L_{CCF}[dB]$ denotes a dB value of correlation loss, CCF($\tau$) denotes a variable that represents a cross-correlation sequence between an actual baseband signal and an ideal baseband signal and is determined by correlation time delay $\tau$.

In a class of this embodiment, the method further comprises a process for quantitative assessment of pseudo-code ranging error and code tracking performance in 5), and the process is specifically as follows:

for pseudo-code-ranging error, as one metric, it may be obtained as follows: firstly, according to correlation peaks of the ideal baseband signal and the actual baseband signal, calculating a corresponding discriminant function, then performing linear fitting to zero-crossing point offset of the discriminant function; the correspondingly obtained data can be used to reflect the pseudo-code ranging error; and for code tracking performance, as another metric, it may be obtained as follows: firstly, according to correlation peaks of the ideal baseband signal and the actual baseband signal, calculating corresponding discriminant functions respectively, then performing linear fitting to zero-crossing point slopes of the two discriminant functions respectively; the correspondingly obtained ratio of the slops can be used to reflect the code tracking performance.

In a class of this embodiment, the method further comprises a process for calculations of a signal-component phase difference and a signal-component magnitude difference in 5), and the calculations are executed respectively according to the following formulas:

$$\Delta \theta_i = \theta_i^t - \theta_i$$

where, $\Delta \theta_i$ denotes a phase difference of an i-th signal component of the actual baseband signal, $\theta_i^t$ denotes a phase angle of the maximum-modulus point in the cross-correlation sequence between the i-th signal components of the actual baseband signal and the ideal baseband signal, $\theta_i$ denotes a design value of the carrier phase of the i-th signal component of the ideal baseband signal;

$$\Delta p_i[dB] = 10 \times \log_{10}\left(\frac{p_i^t}{p_i}\right)$$

where, $\Delta p_i[dB]$ denotes the dB value of the magnitude difference of the i-th signal component of the actual baseband signal, $p_i$ denotes a design value of the proportion of the i-th signal component of the actual baseband signal to the total power, $p_i^t$ denotes an actual value of the proportion of the i-th signal component of the actual baseband signal to the total power.

In a class of this embodiment, the method further comprises a process for calculations of signal-component code phase consistency and frequency-point code phase consistency in 5), and the calculations are executed respectively according to the following formulas:

$$\Delta \varepsilon_{i\text{-}th\ component} = \varepsilon_{i\text{-}th\ component} - \varepsilon_0$$

where, $\Delta \varepsilon_{i\text{-}th\ component}$ denotes a code phase deviation of an i-th signal component of the actual baseband signal, $\varepsilon_{i\text{-}th\ frequency\text{-}point}$ denotes a zero-crossing point offset value of the discriminant function of the i-th signal component, $\varepsilon_0$ denotes a zero-crossing point offset value of the discriminant function of the reference signal component;

$$\Delta \varepsilon_{i\text{-}th\ frequency\text{-}point} = \varepsilon_{i\text{-}th\ frequency\text{-}point} - \varepsilon_1$$

where, $\Delta \varepsilon_{i\text{-}th\ frequency\text{-}point}$ denotes a code phase deviation of an i-th frequency point of the actual baseband signal, $\varepsilon_{i\text{-}th\ frequency\text{-}point}$ denotes a zero-crossing point offset value of the discriminant function of the aggregate signal at the i-th frequency point, $\varepsilon_1$ denotes a zero-crossing point offset value of the discriminant function of aggregate signal at the reference frequency point.

In a class of this embodiment, the method further comprises processes of calculations of a series of metrics comprising: signal power spectrum, spectrum distortion, constellation diagram, error vector magnitude (EVM), and carrier leakage in 5).

Advantages of the method for assessing the quality of the radio frequency signal for the satellite navigation system according to embodiments of the invention are summarized as follows:

1. Because of direct RF-sampling signal, signal distortion caused by hardware analog frequency-conversion channels is avoided, and signal sampling at multi frequency points as well as assessing inter-channel phase consistency at the meantime can be realized.
2. Eye-diagram assessment is not employed by the method of the invention, instead, a discriminant function is established in correspondence to a correlation peak, and distortion of zero-crossing point offset and zero-crossing point slope of the discriminant function is obtained by using a fitting algorithm; in this way, precise and quantitative assessment of the two metrics—pseudo-code ranging error and code tracking performance—is obtained.
3. Another two assessment metrics, namely, signal-component phase difference and signal-component magnitude difference, are proposed, and calculation of the two assessment metrics is studied; tests have shown that, this approach is more suitable for the quality assessment of a composite signal containing three or more branch signal components in current GNSS; in addition, still another two assessment metrics, namely, signal-component code phase consistency and frequency-point code phase consistency, are proposed, and thus accurate assessment of inter-channel phase consistency is obtained.
4. The quality assessment method of the present invention is easy for manipulation, and can more explicitly explain the relationships between the signal quality metrics and signal-acquisition, -tracking and -demodulation performance, and therefore is particularly suitable for quality of the RF signal assessment for satellite navigation systems.

BRIEF DESCRIPTION OF THE DRAWINGS

The invention is described hereinbelow with reference to accompanying drawing, in which the sole FIGURE is a schematic diagram of a method for assessing a quality of a radio frequency signal for a satellite navigation system according to one embodiment of the invention.

DETAILED DESCRIPTION OF THE EMBODIMENTS

For further illustrating the invention, experiments detailing a method for assessing a quality of a radio frequency signal for a satellite navigation system are described below. It should be noted that the following examples are intended to describe and not to limit the invention.

The sole figure is a schematic workflow diagram of a quality of the RF signal assessment method according to a preferred embodiment of the present invention. As shown in the sole figure, the quality of the RF signal assessment method comprises the following steps:

Step 1

Sampling a RF signal of satellite payload to obtain an IF signal, then filtering the IF signal.

Specifically, firstly, acquiring a satellite signal to-be-assessed by sampling a RF signal of satellite payload, for example, by intercepting a tow-code-cycle signal; according to the sampling rate and the center frequency of the RF signal, calculating the IF frequency of the sampling signal, and filtering the RF-sampling signal, for example, through an ideal block filter, to obtain the IF signal to-be-assessed. Then, according to the signal framework of the signal to be assessed, generating a one-code-cycle ideal baseband aggregate signal and respective branch signal components thereof.

Step 2

Downconverting the filtered IF signal to obtain a corresponding actual baseband signal.

Step 3

On the basis of the actual baseband signal to-be-assessed obtained in step 2 and the signal framework thereof, generating respective branch signal components of an ideal baseband signal having a same sampling rate and one-code-cycle length; then, by utilizing the actual baseband signal and the respective branch signal components of the ideal baseband signal, reproducing an ideal baseband signal to be used to assess the actual baseband signal.

Step 4

Establishing a correlation function between an actual baseband signal to-be-assessed and the ideal baseband signal, to be used in subsequent processes for calculation of a plurality of assessment metrics, the correlation function being shown as below:

$$CCF(\tau) = \frac{\int_0^{T_p} s_{rec}(t) s_0^*(t-\tau) dt}{\sqrt{\int_0^{T_p} |s_{rec}(t)|^2 dt \int_0^{T_p} |s_0(t)|^2 dt}}$$

where, $s_{rec}(t)$ denotes a variable that represents the actual baseband signal $s_{rec}$ and is determined by a time variable t, $s_0(t)$ denotes a variable that represents the ideal baseband signal $s_0$ and is determined by the time variable t, t denotes the time variable, $\tau$ denotes a correlation time delay, Tp denotes a length of time of the actual baseband signal $s_{rec}$, $s_0^*(t-\tau)$ denotes a conjugate operation executed on a variable that represents the ideal baseband signal $s_0$ and is determined by both the time variable t and the correlation time delay $\tau$, $CCF(\tau)$ denotes a variable that represents a cross-correlation sequence CCF between the actual baseband signal $s^{rec}$ and the ideal baseband signal $s_0$ and is determined by the correlation time delay $\tau$.

Step 5

By utilizing the correlation function established in above step, calculating quality-assessment metrics related to in-band spurious and correlation loss, thereby accomplishing quality assessment procedure of the RF signal.

According to a preferred embodiment of the present invention, for the calculation of in-band spurious, it is preferably executed according to the following formula:

$$r_{ST}[dBc] = 10 \times \log_{10}(1 - \max(|CCF(\tau)|^2))$$

where, $r_{ST}[dBc]$ denotes a dB value of in-band spurious, $CCF(\tau)$ denotes a variable that represents a cross-correlation sequence between an actual baseband signal and an ideal baseband signal and is determined by correlation time delay $\tau$;

Likewise, for the calculation of correlation loss, it is preferably executed according to the following formula:

$$L_{CCF}[dBc] = 20 \times \log_{10}(\max(|CCF(\tau)|^2))$$

where, $L_{CCF}[dBc]$ denotes a dB value of correlation loss, $CCF(\tau)$ denotes a variable that represents a cross-correlation sequence between an actual baseband signal and an ideal baseband signal and is determined by correlation time delay $\tau$.

In order to perform a more comprehensive and accurate assessment of a RF signal of satellite navigation system, apart from the above basic metrics such as in-band spurious and correlation loss, the present invention also designs several other relevant quality-assessment metrics, of which the calculation or processing processes are explained respectively and specifically as follows:

Pseudo-Code Ranging Error

According to a preferred embodiment of the present invention, this metric preferably may be obtained by a process as follows: firstly, according to a correlation peak of the ideal baseband signal, calculating a corresponding discriminant function, then using fitting, for example linear fitting, to obtain zero-crossing point offset of the discriminant function; thus the pseudo-code ranging error of the navigation signal is:

$$e_{DB} = \varepsilon_b(\sigma) \times c$$

where, $e_{DB}$ denotes ranging deviation caused by signal distortion, with unit m, $\varepsilon_b(\sigma)$ denotes zero-crossing point offset of the discriminator, with unit s, c denotes electromagnetic wave propagation speed.

Code Tracking Performance

According to a preferred embodiment of the present invention, this metric preferably may be obtained by a process as follows: firstly, according to correlation peaks of both the ideal baseband signal and the actual baseband signal, calculating corresponding discriminant functions respectively, then using fitting, for example linear fitting, to obtain zero-crossing point slopes of the two discriminant functions respectively; thus, the ratio of the two slopes can be used to reflect the code tracking performance.

Signal-Component Phase Difference

According to a preferred embodiment of the present invention, this assessment metric may be calculated according to the following formula:

$$\Delta\theta_i = \theta_i' - \theta_i$$

where, $\Delta\theta_i$ denotes a phase difference of an i-th signal component of the actual baseband signal, $\theta_i'$ denotes a phase angle of the maximum-modulus point in the cross-correlation sequence between the i-th signal components of the actual baseband signal and the ideal baseband signal, $\theta_i$ denotes a design value of the carrier phase of the i-th signal component of the ideal baseband signal;

Signal-Component Magnitude Difference

According to a preferred embodiment of the present invention, this assessment metric may be calculated according to the following formula:

$$\Delta p_i[dB] = 10 \times \log_{10}\left(\frac{p_i^t}{p_i}\right)$$

where, $\Delta p_i[dB]$ denotes the dB value of the magnitude difference of the i-th signal component of the actual baseband signal, $p_i$ denotes a design value of the proportion of the i-th signal component of the actual baseband signal to the total power, $p_i^t$ denotes the actual value of the proportion of the i-th signal component of the actual baseband signal to the total power.

Signal-Component Code Phase Consistency

According to a preferred embodiment of the present invention, this assessment metric may be calculated according to the following formula:

$$\Delta\varepsilon_{i\text{-th component}} = \varepsilon_{i\text{-th component}} - \varepsilon_0$$

where, $\Delta\varepsilon_{i\text{-th component}}$ denotes a code phase deviation of an i-th signal component of the actual baseband signal $\varepsilon_{i\text{-th component}}$ denotes a zero-crossing point offset value of the discriminant function of the i-th signal component, $\varepsilon_0$ denotes a zero-crossing point offset value of the discriminant function of the reference signal component.

Frequency-Point Code Phase Consistency

According to a preferred embodiment of the present invention, this assessment metric may be calculated according to the following formula:

$$\Delta\varepsilon_{i\text{-th frequency-point}} = \varepsilon_{i\text{-th frequency-point}} - \varepsilon_1$$

where, $\Delta\varepsilon_{i\text{-th frequency-point}}$ denotes a code phase deviation of an i-th frequency point of the actual baseband signal, $\varepsilon_{i\text{-th frequency-point}}$ denotes a zero-crossing point offset value of the discriminant function of the aggregate signal at the i-th frequency point, $\varepsilon_1$ denotes a zero-crossing point offset value of the discriminant function of the aggregate signal at the reference frequency point.

In addition, the quality of the RF signal assessment method according to the present invention preferably further comprises processes for involving a series of metrics—including signal power spectrum, spectrum distortion, constellation diagram, error vector magnitude (EVM), carrier leakage, etc.—in the quality-assessment procedure; the calculation and processing processes of these metrics are explained respectively and specifically as follows:

Plotting Signal Power Spectrum

Firstly, an FFT algorithm, for example, may be used to analyze the Fourier transform $S_{rec}(f)$ of the actual baseband signal $s_{rec}(t)$, thus the signal power spectrum is $$P = \frac{|S_{rec}(f)|^2}{T \cdot Fs^2},$$

and accordingly, the power spectrum can be plotted, where, T denotes the length of time of the sampling signal, here it is a one-code-cycle length, Fs denotes the signal sampling rate.

In addition, a power spectrum envelope may be extracted. Based on inverse Fourier transform of the product of the signals in frequency domain, time-domain correlation is calculated, then the time-domain correlation is time-windowed, with the time-window width generally being taken as 5 code-chip widths (the size of the time window determines the fineness degree of the power spectrum envelope; the wider the time window, the finer the power spectrum envelope curve), and subsequently, through fast Fourier transform of the time-windowed time-domain correlation, the power spectrum envelope is obtained.

Signal Spectrum Distortion

Firstly, the actual baseband signal spectrum $S_{rec}(f)$ and the ideal baseband signal spectrum $S_s(f)$ are calculated respectively, then the spectrum distortion may be calculated according to the following formula, and accordingly, a distortion diagram can be plotted.

$$H(f) = 20\log\frac{S_{rec}(f)\Big/\sqrt{\int_{f_l}^{f_h} S_{rec}(f)S_{rec}^*(f)df}}{S_s(f)\Big/\sqrt{\int_{f_l}^{f_h} S_s(f)S_s^*(f)df}}$$

Plotting Constellation Diagram

Firstly, both the ideal baseband signal and the actual baseband signal undergo magnitude normalization, that is, the actual baseband signal is divided by its average magnitude, thereby obtaining the normalized actual signal, and the normalized ideal signal can be obtained likewise.

Then, in a coordinate, taking the I branch of the normalized actual signal as horizontal axis, the Q branch as vertical axis, a scatter diagram of the actual signal can be plotted, with the range of the horizontal and vertical axes being $[X_{min}, X_{max}, Y_{min}, Y_{max}]$, where, $X_{min}$ denotes the minimum abscissa of the signal points, $X_{max}$ denotes the maximum abscissa of the signal points, $Y_{min}$ denotes the minimum ordinate of the signal points, $Y_{max}$ denotes the maximum ordinate of the signal points. The plane of the axes is divided into N*N equal-area square grids, for example, taking N=100. The number of signal points in each square grid is counted, and the color depth of each square grid is set according to the number of points; Likewise, the ideal signal points are plotted in the same diagram for comparison.

Error Vector Magnitude

Firstly, both the actual baseband signal to-be-assessed and the ideal baseband signal may be normalized, so that the average magnitude of the normalized signal is 1;

Next, the ideal baseband signal points are numbered according to their distribution positions on the coordinate and denoted as $V_k = I_k + jQ_k$, then according to the distances from the actual baseband signal points to these K ideal baseband signal points, all of the actual baseband signal points and the ideal baseband signal points that pertain to a closest distance are sorted into one class and denoted as below:

$$\{(I_{rec}(m), Q_{rec}(m))|(I_{ideal}(m), Q_{ideal}(m))=V_k, m=1, 2, \ldots, M_k\}$$

where, $M_k$ denotes, in a sample, the number of the sampling points corresponding to the signal vector $V_k$, ($I_{rec}$(m), $Q_{rec}$(m)) denotes the actual signal points, ($I_{ideal}$(m), $Q_{ideal}$(m)), denotes the ideal signal points;

Consequently, the vector error magnitude of the to-be-assessed signal corresponding to the signal vector Vie is calculated according to the following formula:

$$EVM_k = \sqrt{(I_{rec}^k - I_k)^2 + (Q_{rec}^k - Q_k)^2}$$

where, ($I_{rec}^k$, $Q_{rec}^k$) denotes the k-class of actual signal points, i.e., the actual signal points corresponding to the ideal signal vector $V_k$.

Carrier Leakage

The carrier leakage is calculated according to the following formula, where, G(f) denotes the calculated signal power spectrum in step 6), $f_c$ denotes the carrier frequency, with unit Hz, [$f_l$, $f_h$] denotes the frequency range of the specified frequency band:

$$L_c = 10 \times \log_{10}\left(\frac{\int_{f_c-1}^{f_c+1} G(f)df}{\int_{f_l}^{f_h} G(f)df}\right)$$

For the above-mentioned series of metrics, including signal power spectrum, spectrum distortion, constellation diagram, error vector magnitude, carrier leakage, etc., their basic calculation and processing formulas are common knowledge well known to those skilled in the art, and thus will not be described here.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of distributing time signals from a satellite in a satellite navigation system to a navigation device, the method comprising:
  1) activating the navigation device to receive a radio frequency signal from a satellite and sampling the radio frequency signal to obtain an intermediate frequency signal, then activating an electronic filter to filter the intermediate frequency signal to obtain a filtered intermediate frequency signal;
  2) downconverting the filtered intermediate frequency signal to obtain a corresponding actual baseband signal;
  3) generating respective branch signal components of an ideal baseband signal having a same sampling rate and one-code-cycle length on the basis of the actual baseband signal obtained in 2) and a signal framework thereof; and by utilizing the actual baseband signal and the respective branch signal components of the ideal baseband signal, reproducing an ideal baseband signal to be used to assess the actual baseband signal;
  4) establishing a correlation function between an actual baseband signal to-be-assessed and the ideal baseband signal as follows:

$$CCF(\tau) = \frac{\int_0^{T_p} s_{rec}(t) s_0^*(t-\tau) dt}{\sqrt{\int_0^{T_p} |s_{rec}(t)|^2 dt \int_0^{T_p} |s_0(t)|^2 dt}}$$

wherein $s_{rec}(t)$ denotes a variable that represents the actual baseband signal $s_{rec}$ and is determined by a time variable t, $s_0(t)$ denotes a variable that represents the ideal baseband signal $s_0$ and is determined by the time variable t, t denotes the time variable, $\tau$ denotes a correlation time delay, $T_p$ denotes a length of time of the actual baseband signal $s_{rec}$, $s_0^*(t-\tau)$ denotes a conjugate operation executed on a variable that represents the ideal baseband signal $s_o$ and is determined by both the time variable t and the correlation time delay $\tau$, and $CCF(\tau)$ denotes a variable that represents a cross-correlation sequence CCF between the actual baseband signal $s_{rec}$ and the ideal baseband signal $s_o$ and is determined by the correlation time delay $\tau$;
  5) by utilizing the correlation function established in 4), calculating quality-assessment metrics related to in-band spurious and correlation loss, thereby accomplishing quality assessment procedure of the radio frequency signal; and
  6) activating the navigation device to determine time based on the radio frequency signal.

2. The method of claim 1, wherein the in-band spurious and the related losses are calculated according to the following formulas:

$$r_{ST}[dBc] = 10 \times \log_{10}(1 - \max(|CCF(\tau)|^2))$$

wherein $r_{ST}[dBc]$ denotes a dB value of in-band spurious;

$$L_{CCF}[dB] = 20 \times \log_{10}(\max(|CCF(\tau)|^2))$$

wherein $L_{CCF}[dB]$ denotes a dB value of correlation loss.

3. The method of claim 2, further comprising a process for quantitative assessment of pseudo-code ranging error and code tracking performance in 5), and the process is specifically as follows:
  for pseudo-code-ranging error, as one metric, it may be obtained as follows: firstly, according to correlation peaks of the ideal baseband signal and the actual baseband signal, calculating a corresponding discriminant function, then performing linear fitting to zero-crossing point offset of the discriminant function; the correspondingly obtained data can be used to reflect the pseudo-code ranging error; and
  for code tracking performance, as another metric, it may be obtained as follows: firstly, according to correlation peaks of the ideal baseband signal and the actual baseband signal, calculating corresponding discriminant functions respectively, then performing linear fitting to zero-crossing point slopes of the two discriminant functions respectively; the correspondingly obtained ratio of the slops can be used to reflect the code tracking performance.

4. The method of claim 2, further comprising a process for calculations of a signal-component phase difference and a signal-component magnitude difference in 5), and the calculations are executed respectively according to the following formulas:

$$\Delta\theta_i = \theta_i' - \theta_i$$

wherein $\Delta\theta_i$ denotes a phase difference of an i-th signal component of the actual baseband signal, $\theta_i'$ denotes a phase angle of the maximum-modulus point in the cross-correlation sequence between the i-th signal components of the actual baseband signal and the ideal baseband signal, and $\theta_i$ denotes a design value of the carrier phase of the i-th signal component of the ideal baseband signal;

$$\Delta p_i[dB] = 10 \times \log_{10}\left(\frac{p_i^t}{p_i}\right)$$

wherein $\Delta P_i[dB]$ denotes the dB value of the magnitude difference of the i-th signal component of the actual baseband signal, $P_i$ denotes a design value of the proportion of the i-th signal component of the actual baseband signal to the total power, and $P_i^t$ denotes an actual value of the proportion of the i-th signal component of the actual baseband signal to the total power.

5. The method of claim 2, further comprising a process for calculations of signal-component code phase consistency and frequency-point code phase consistency in 5), and the calculations are executed respectively according to the following formulas:

$$\Delta \varepsilon_{i\text{-}th\ component} = \varepsilon_{i\text{-}th\ component} - \varepsilon_0$$

wherein $\Delta \varepsilon$i-th component denotes a code phase deviation of an i-th signal component of the actual baseband signal, $\varepsilon_{i\text{-}th\ component}$ denotes a zero-crossing point offset value of the discriminant function of the i-th signal component, and $\varepsilon_0$ denotes a zero-crossing point offset value of the discriminant function of the reference signal component;

$$\Delta \varepsilon_{i\text{-}th\ frequency\text{-}point} = \varepsilon_{i\text{-}th\ frequency\text{-}point} - \varepsilon_1$$

wherein $\Delta \varepsilon_{i\text{-}th\ frequency\text{-}point}$ denotes a code phase deviation of an i-th frequency point of the actual baseband signal, $\varepsilon_{i\text{-}th\ frequency\text{-}point}$ denotes a zero-crossing point offset value of the discriminant function of the aggregate signal at the i-th frequency point, and $\varepsilon_1$ denotes a zero-crossing point offset value of the discriminant function of aggregate signal at the reference frequency point.

6. The method of claim 1, further comprising a process for quantitative assessment of pseudo-code ranging error and code tracking performance in 5), and the process is specifically as follows:

for pseudo-code-ranging error, as one metric, it may be obtained as follows: firstly, according to correlation peaks of the ideal baseband signal and the actual baseband signal, calculating a corresponding discriminant function, then performing linear fitting to zero-crossing point offset of the discriminant function; the correspondingly obtained data can be used to reflect the pseudo-code ranging error; and for code tracking performance, as another metric, it may be obtained as follows: firstly, according to correlation peaks of the ideal baseband signal and the actual baseband signal, calculating corresponding discriminant functions respectively, then performing linear fitting to zero-crossing point slopes of the two discriminant functions respectively; the correspondingly obtained ratio of the slops can be used to reflect the code tracking performance.

7. The method of claim 6, further comprising a process for calculations of a signal-component phase difference and a signal-component magnitude difference in 5), and the calculations are executed respectively according to the following formulas:

$$\Delta \theta_i = \theta_i' - \theta_i$$

wherein $\Delta \theta_i$ denotes a phase difference of an i-th signal component of the actual baseband signal, $\theta_i^t$ denotes a phase angle of the maximum-modulus point in the cross-correlation sequence between the i-th signal components of the actual baseband signal and the ideal baseband signal, and $\theta_i$ denotes a design value of the carrier phase of the i-th signal component of the ideal baseband signal;

$$\Delta p_i[dB] = 10 \times \log_{10}\left(\frac{p_i^t}{p_i}\right)$$

wherein $\Delta P_i[dB]$ denotes the dB value of the magnitude difference of the i-th signal component of the actual baseband signal, $P_i$ denotes a design value of the proportion of the i-th signal component of the actual baseband signal to the total power, and $P_i^t$ denotes an actual value of the proportion of the i-th signal component of the actual baseband signal to the total power.

8. The method of claim 6, further comprising a process for calculations of signal-component code phase consistency and frequency-point code phase consistency in 5), and the calculations are executed respectively according to the following formulas:

$$\Delta \varepsilon_{i\text{-}th\ component} = \varepsilon_{i\text{-}th\ component} - \varepsilon_0$$

wherein $\Delta \varepsilon_{i\text{-}th\ component}$ denotes a code phase deviation of an i-th signal component of the actual baseband signal, $\varepsilon_{i\text{-}th\ component}$ denotes a zero-crossing point offset value of the discriminant function of the i-th signal component, and $\varepsilon_0$ denotes a zero-crossing point offset value of the discriminant function of the reference signal component;

$$\Delta \varepsilon_{i\text{-}th\ frequency\text{-}point} = \varepsilon_{i\text{-}th\ frequency\text{-}point} - \varepsilon_1$$

wherein $\Delta \varepsilon_{i\text{-}th\ frequency\text{-}point}$ denotes a code phase deviation of an i-th frequency point of the actual baseband signal, $\varepsilon_{i\text{-}th\ frequency\text{-}point}$ denotes a zero-crossing point offset value of the discriminant function of the aggregate signal at the i-th frequency point, and $\varepsilon_1$ denotes a zero-crossing point offset value of the discriminant function of aggregate signal at the reference frequency point.

9. The method of claim 1, further comprising a process for calculations of a signal-component phase difference and a signal-component magnitude difference in 5), and the calculations are executed respectively according to the following formulas:

$$\Delta \theta_i = \theta_i' - \theta_i$$

wherein $\Delta \theta_i$ denotes a phase difference of an i-th signal component of the actual baseband signal, $\theta_i^t$ denotes a phase angle of the maximum-modulus point in the cross-correlation sequence between the i-th signal components of the actual baseband signal and the ideal baseband signal, and $\theta_i$ denotes a design value of the carrier phase of the i-th signal component of the ideal baseband signal;

$$p_i[\mathrm{dB}] = 10 \times \log_{10}\left(\frac{p_i^t}{p_i}\right)$$

wherein $\Delta P_i[\mathrm{dB}]$ denotes the dB value of the magnitude difference of the i-th signal component of the actual baseband signal, $P_i$ denotes a design value of the proportion of the i-th signal component of the actual baseband signal to the total power, and $P_i^t$ denotes an actual value of the proportion of the i-th signal component of the actual baseband signal to the total power.

10. The method of claim 9, further comprising a process for calculations of signal-component code phase consistency and frequency-point code phase consistency in 5), and the calculations are executed respectively according to the following formulas:

$$\Delta\varepsilon_{i\text{-th component}} = \varepsilon_{i\text{-th component}} - \varepsilon_0$$

wherein $\Delta\varepsilon_{i\text{-th component}}$ denotes a code phase deviation of an i-th signal component of the actual baseband signal, $\varepsilon_{i\text{-th component}}$ denotes a zero-crossing point offset value of the discriminant function of the i-th signal component, and $\varepsilon_0$ denotes a zero-crossing point offset value of the discriminant function of the reference signal component;

$$\Delta\varepsilon_{i\text{-th frequency-point}} = \varepsilon_{i\text{-th frequency-point}} - \varepsilon_1$$

wherein $\Delta\varepsilon_{i\text{-th frequency-point}}$ denotes a code phase deviation of an i-th frequency point of the actual baseband signal, $\varepsilon_{i\text{-th frequency-point}}$ denotes a zero-crossing point offset value of the discriminant function of the aggregate signal at the i-th frequency point, and $\varepsilon_j$ denotes a zero-crossing point offset value of the discriminant function of aggregate signal at the reference frequency point.

11. The method of any of claim 1, further comprising a process for calculations of signal-component code phase consistency and frequency-point code phase consistency in 5), and the calculations are executed respectively according to the following formulas:

$$\Delta\varepsilon_{i\text{-th component}} = \varepsilon_{i\text{-th component}} - \varepsilon_0$$

wherein $\Delta\varepsilon_{i\text{-th component}}$ denotes a code phase deviation of an i-th signal component of the actual baseband signal, $\varepsilon_{i\text{-th component}}$ denotes a zero-crossing point offset value of the discriminant function of the i-th signal component, and $\varepsilon_0$ denotes a zero-crossing point offset value of the discriminant function of the reference signal component;

$$\Delta\varepsilon_{i\text{-th frequency-point}} = \varepsilon_{i\text{-th frequency-point}} - \varepsilon_1$$

wherein $\Delta\varepsilon_{i\text{-th frequency-point}}$ denotes a code phase deviation of an i-th frequency point of the actual baseband signal, $\varepsilon_{i\text{-th frequency-point}}$ denotes a zero-crossing point offset value of the discriminant function of the aggregate signal at the i-th frequency point, and $\varepsilon_1$ denotes a zero-crossing point offset value of the discriminant function of aggregate signal at the reference frequency point.

12. The method of claim 11, further comprising processes of calculations of a series of metrics comprising: signal power spectrum, spectrum distortion, constellation diagram, error vector magnitude, and carrier leakage in 5).

13. A method of distributing time signals from a satellite in a satellite navigation system to a navigation device, the method comprising:

1) activating the navigation device to receive a radio frequency signal from a satellite and sampling the radio frequency signal to obtain an intermediate frequency signal, then activating an electronic filter to filter the intermediate frequency signal to obtain a filtered intermediate frequency signal;
2) downconverting the filtered intermediate frequency signal to obtain a corresponding actual baseband signal;
3) generating respective branch signal components of an ideal baseband signal having a same sampling rate and one-code-cycle length on the basis of the actual baseband signal obtained in 2) and a signal framework thereof; and by utilizing the actual baseband signal and the respective branch signal components of the ideal baseband signal, reproducing an ideal baseband signal;
4) accomplishing quality assessment procedure of the radio frequency signal; and
5) activating the navigation device to determine time based on the radio frequency signal.

* * * * *